(12) United States Patent
Bachmann et al.

(10) Patent No.: US 8,593,214 B2
(45) Date of Patent: Nov. 26, 2013

(54) FIELD DEVICE FOR PROCESS INSTRUMENTATION

(75) Inventors: Reinhard Bachmann, Lingenfeld (DE); Eric Chemisky, Soultz sous forets (FR); Michael Geppert, Ottersweier (DE); Simon Rohrbach, Greenville, SC (US); Ralf Walter, Waghäusel (DE)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 13/386,484

(22) PCT Filed: Jul. 5, 2010

(86) PCT No.: PCT/EP2010/059534
§ 371 (c)(1),
(2), (4) Date: Apr. 17, 2012

(87) PCT Pub. No.: WO2011/009708
PCT Pub. Date: Jan. 27, 2011

(65) Prior Publication Data
US 2012/0188005 A1    Jul. 26, 2012

(30) Foreign Application Priority Data

Jul. 23, 2009  (DE) .......................... 10 2009 034 419

(51) Int. Cl.
*G05F 1/10*    (2006.01)
*G05F 3/02*    (2006.01)

(52) U.S. Cl.
USPC ........................................................ 327/541

(58) Field of Classification Search
USPC .......................................... 327/538, 540, 541
See application file for complete search history.

(56) References Cited

U.S. PATENT DOCUMENTS

| | | | |
|---|---|---|---|
| 5,974,892 A | 11/1999 | Swart et al. | |
| 7,480,487 B2 | 1/2009 | Smart et al. | |
| 7,764,113 B2* | 7/2010 | Ryu et al. | 327/541 |
| 8,278,997 B1* | 10/2012 | Kim et al. | 327/541 |

FOREIGN PATENT DOCUMENTS

| | | |
|---|---|---|
| DE | 19506014 | 8/1996 |
| DE | 102007035710 | 2/2009 |
| WO | WO 2006127373 | 11/2006 |

* cited by examiner

Primary Examiner — Hai L Nguyen
(74) Attorney, Agent, or Firm — Cozen O'Connor

(57) ABSTRACT

A field device for process instrumentation having an interface for connecting a two-wire cable and for outputting measurement values, wherein the interface comprises a series circuit having a transistor circuit by which the loop current is adjustable as a function of a control signal, a power supply, and a device by which the loop current can be captured as an actual value that is fed by a first feedback coupling to a regulator having integrated behavior. The regulator compares the actual value to a target value, and generates a control signal for the transistor circuit. The actual value is fed by a second feedback coupling to a summation point as a compensation signal for generating an input signal for the transistor circuit as a function of the control signal and the compensation signal to suppress interference coupled into the two-conductor line.

6 Claims, 2 Drawing Sheets

-- PRIOR ART --

FIELD DEVICE FOR PROCESS INSTRUMENTATION

CROSS-REFERENCE TO RELATED APPLICATIONS

This is a U.S. national stage of application No. PCT/EP2010/059534 filed 5 Jul. 2010. Priority is claimed on German Application No. 10 2009 034 419.5 filed 23 Jul. 2009, the content of which is incorporated herein by reference in its entirety.

BACKGROUND OF THE INVENTION

1. Field of the Invention

The invention relates to process instrumentation and, more particularly, to a field device for process instrumentation, which has a standardized 4-20 mA interface for outputting measured values.

2. Description of the Related Art

Versatile field devices are used for process instrumentation for controlling processes in process installations. Measurement transducers are used to detect process variables, such as temperature, pressure, flow rate, filling level, density or gas concentration of a medium. The process sequence can be influenced by actuating elements, as a function of detected process variables, corresponding to a strategy which, for example, is predetermined by a control station. A control valve, a heater or a pump are examples of actuating elements. Particularly in process installations, pressure measurement transducers represent major sensor components for the purposes of automated production sequences. High-quality measurement transducers, which produce disturbance-free measured values, with little susceptibility to errors or faults, even in extreme conditions, are required for an optimum installation behavior and high product quality all the time.

Siemens Catalogue "ST FI 01-2008", Chapter 1 discloses a pressure measurement transducer for process instrumentation, which is equipped with a standardized 4-20 mA interface for outputting a measured value, for example, to a control system. The parameterization is performed digitally using the HART protocol. The measured values of the pressure to be measured are in contrast transmitted as an analogue current.

FIG. 1 shows a conventional design of the output stage for production of the analogue current signal in the 4-20 mA interface of a conventional pressure measurement transducer. A two-wire line, which is not illustrated in the figure, can be connected to two connecting terminals 1 and 2, by which two-wire line the measurement transducer in a process installation can be connected, for example, to a controller station or to an automation appliance. In the output stage, a loop current I is passed via a series circuit that consists of a transistor circuit 3 of an electrical power supply 4 and a measurement resistor 5. The transistor stage 3 is operated by a regulator 6 with a control signal 7.

The loop current I, which is adjusted by the transistor circuit 3, therefore depends on the magnitude of the control signal 7. The electrical power supply 4 supplies the measurement transducer with the power required for its operation. The available power is governed by the magnitude of the loop current I and the voltage U_IN that is dropped across the electrical power supply 4. A portion of the loop current I is supplied through the electrical power supply 4 to a downstream DC/DC converter 8, which uses this to produce voltages 9 that are suitable for operation of the electronic circuits in the measurement transducer. These are not illustrated in FIG. 1, for the sake of clarity.

The high-precision measurement resistor 5 is used to detect the loop current I, and converts this to a voltage signal, which is supplied as an actual value U_ACT to the regulator 6 in a first feedback path 10. The regulator 6 ensures that the detected actual value U_ACT is regulated at a nominal value U_NOM, which is generated, corresponding to the measured pressure, by a microcontroller, which is not illustrated in FIG. 1. The regulator 6 is a regulator with an integrated behavior, which therefore forms a control error from the nominal value U_NOM and the actual value U_ACT, and integrates this control error. The symbol for the regulator 6 illustrated in FIG. 1 shows only its central element, an operational amplifier, for illustrative purposes.

The measurement transducers, in particular, are subject to ever more stringent requirements for measurement accuracy and functional scope. The increasing requirements also have effects on the design of the output stage of the 4-20 mA interface. The requirements relating to the accuracy of the output measured value are, for example, influenced directly by the setting accuracy of the loop current I with the aid of the measurement resistor 5, the regulator 6 and the transistor circuit 3. An operational amplifier that is highly precise and has a low offset voltage is required in particular for the implementation of the regulator 6. Furthermore, the output stage of the interface has to manage with a very low current draw in order that sufficient operating power is available to provide the desired functional scope for the other electronic circuits of the measurement transducer. Particularly with regard to the choice of the operational amplifier and transistor circuit, this means that only components that draw very little current may be used. Furthermore, the output circuit must be distinguished by a high level of EMC (electromagnetic compatibility) or immunity to noise. This means the capability of the output stage to withstand disturbance variables of a specific level without malfunction. According to Criterion A of NAMUR Recommendation NE21, no identifiable adverse effect on the function should be caused by specific disturbances. For example, NE21 specifies as a disturbance radio-frequency injection in the frequency range from 10 kHz to 80 MHz, and an amplitude of 10 V, or application of rapid transients (burst) at 1 kV via the two-wire line. The current output of the field device with a 4-20 mA interface and a class accuracy of 0.5% must not differ from the nominal value by more than 0.16 mA under a disturbance influence, when the actual output value is 12 mA.

In terms of the stated requirements, the known output stage has the following disadvantages:

The gain of the transistor circuit 3 is limited, because only a single PNP power transistor is used, which has a gain in the order of magnitude of 50. This requires a relatively high drive current for the transistor, which flows away to ground GND. The drive current is therefore no longer available for producing the power required for operating the measurement transducer. The power available for the electronics is therefore reduced by about 3%.

In order to compensate for disturbances that are injected into the output stage via a two-wire line connected to the connections 1 and 2, the regulator 6 must have, in addition to the required accuracy for the adjustment of the loop current I, a high operational speed. This can be achieved only by an operational amplifier that has a comparatively high power consumption. In comparison to the use of an ultra-low-power version, this results in a reduction in the power available for supplying the electronics by a further 3%.

6% of the available operating power is therefore actually consumed in the known output stage. With the continuously more stringent requirements for field devices in terms of their performance with respect to measurement rate, functional scope, graphics display, display lighting, SIL (Safety Integrity Level) in accordance with IEC/EN61508, etc., it is becoming increasingly necessary for the electrical power, which is urgently required to supply the electronics for providing the large number of functions, to no longer be lost to this extent in the output stage.

SUMMARY OF THE INVENTION

It is therefore an object of the invention to provide a field device for process instrumentation, whose output stage has a comparatively low power consumption, and which nevertheless is relatively insensitive to electromagnetic disturbances.

This and other objects and advantages are achieved in accordance with the invention by providing a field device in which injected disturbances can be advantageously compensated for via the two-wire line without having to place any particular requirements on the speed of the regulator, which is used to drive the transistor circuit. Effectively, a subordinate, second control loop is formed to suppress disturbances injected via the two-wire line, by passing a second feedback path with a compensation signal directly, and not via the regulator with an integrating behavior, to a transistor circuit for adjusting the loop current. EMC disturbances are therefore filtered by an internal, rapid control loop, and the operational amplifier used in the regulator can be designed to be considerably slower. It is therefore possible to use an operational amplifier which draws considerably less current. The current drawn by the output stage can furthermore be reduced further by the introduction of a second feedback path for suppression of injected disturbances, by using a transistor circuit with a considerably higher gain. The gain factor may, for example, now be 50,000, as a result of which no further appreciable power loss as a result of the drive current for the transistor circuit occurs.

The use of a high-pass filter for production of the compensation signal in the second feedback path has the advantage that only the radio-frequency disturbances and transients in the subordinate control loop are passed to the input of the transistor circuit. The transistor circuit reacts thereto very quickly, because it is composed essentially of transistors. By way of example, a series circuit comprising an ohmic resistor and a capacitor may be used as a high-pass filter. A resistance value in the order of magnitude of 100 kΩ and a capacitance in the order of magnitude of 1 nF have been found to be suitable for the transistor circuit having a gain factor of 50,000. The precise dimensions of the components are very highly dependent on the characteristics of the transistor circuit used, and can be determined empirically by application of specific disturbances to the output stage and assessment of the disturbance suppression achieved with the respective setting.

In one particularly advantageous embodiment, a proportional element for superimposition of a component that is proportional to the loop current is connected in parallel with the high-pass filter in the second feedback path. This feedback path, which can also be referred to as DC feedback, reduces the gain of the transistor circuit. This reduction in the gain advantageously amplifies the output noise from the regulator to a lesser extent. The requirements for the noise behavior of the regulator are therefore less critical than if the parallel-connected proportional element were to be dispensed with, without the gain of the transistor circuit still needing to be high, without any change. On the other hand, the parallel-connected proportional element makes it possible to use an operational amplifier in the electronic circuit of the regulator, which has higher self-noise and is therefore commercially available more cheaply.

Disturbances injected via the two-wire line are advantageously suppressed by the rapid, subordinate control loop. As a result, this is no longer the task of the regulator in the outer control loop. As already mentioned above, this has the advantage that the rapidity of the regulator is no longer subject to stringent requirements. However, if a regulator with a medium bandwidth is used, it may be worthwhile to use a low-pass filter in the first feedback path to keep EMC disturbances in the medium frequency range, for example, in a range from 10 kHz to 1 MHz, away from the regulator input. This results in complete functional isolation, specifically in that the rapid, subordinate control loop is used to suppress the EMC disturbances, and in that the regulator in the outer control loop is exclusively responsible for the accuracy of the measured-value output with an analogue current signal. An ultra-low-power operational amplifier with high accuracy can be used, such as the LMP2231 Type from National Semiconductor, or the AD8603 Type from Analog Devices. The two control loops can be optimally matched to their respective function.

The use of a transistor circuit with a Darlington stage has the advantage that the transistor circuit has a considerably higher gain, which is in the order of magnitude of 50 000, and that, in consequence, only a very low signal power level is required to operate the transistor circuit. The sensitivity of a transistor circuit having a high gain such as this to injected EMC disturbances is not critical because of the rapid, subordinate control loop that is used to suppress disturbances injected via the two-wire line. The regulator in the outer control loop need no longer react to the EMC disturbances. Despite the high gain of the transistor circuit, it is possible to use a regulator with a low bandwidth, which is distinguished by drawing a relatively low current.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention as well as refinements and advantages will be explained in more detail in the following text with reference to the drawings, which illustrate a known embodiment as well as one exemplary embodiment of the invention, and in which.

DETAILED DESCRIPTION OF THE PREFERRED EMBODIMENTS

Figure 1:
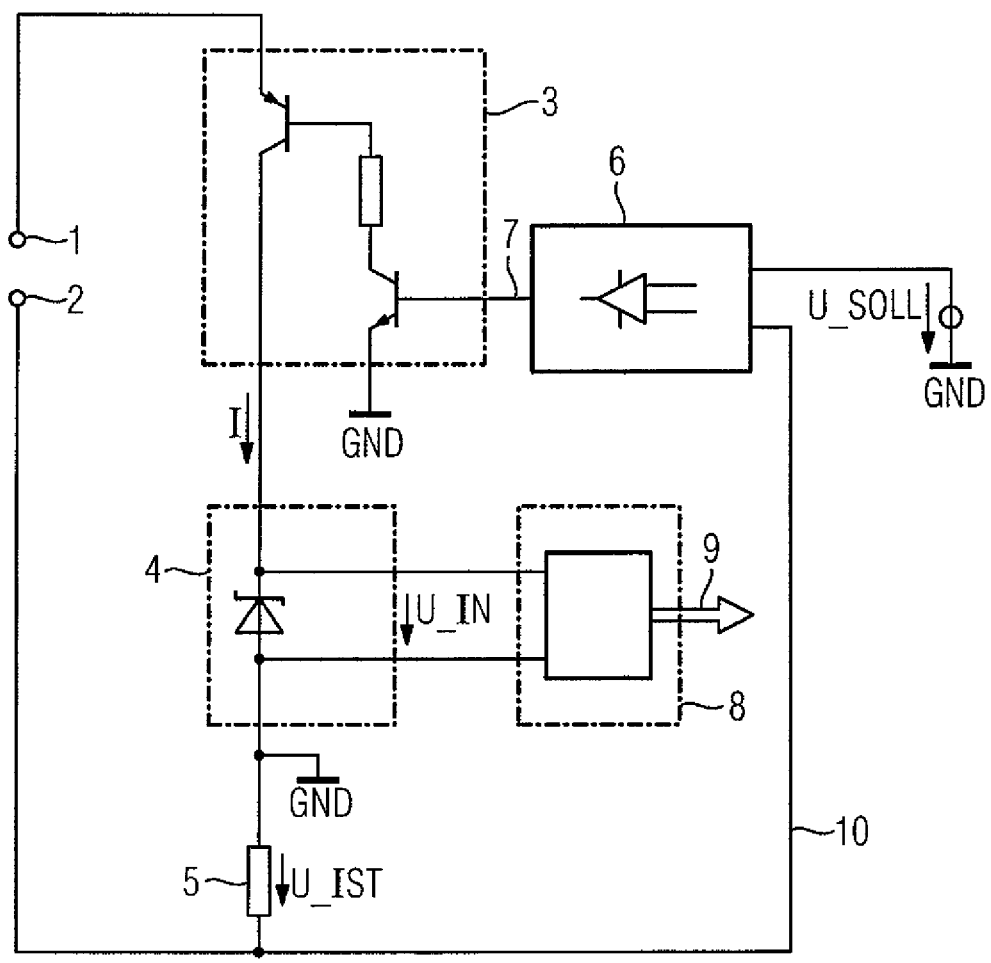
FIG. 1 is a schematic block diagram of a conventional output stage of a measurement transducer with a 4-20 mA interface.

As already explained in more detail above, FIG. 1 shows an outline circuit of an output stage of a 4-20 mA interface as is used in a conventional SITRAS P pressure measurement transducer.

Figure 2:
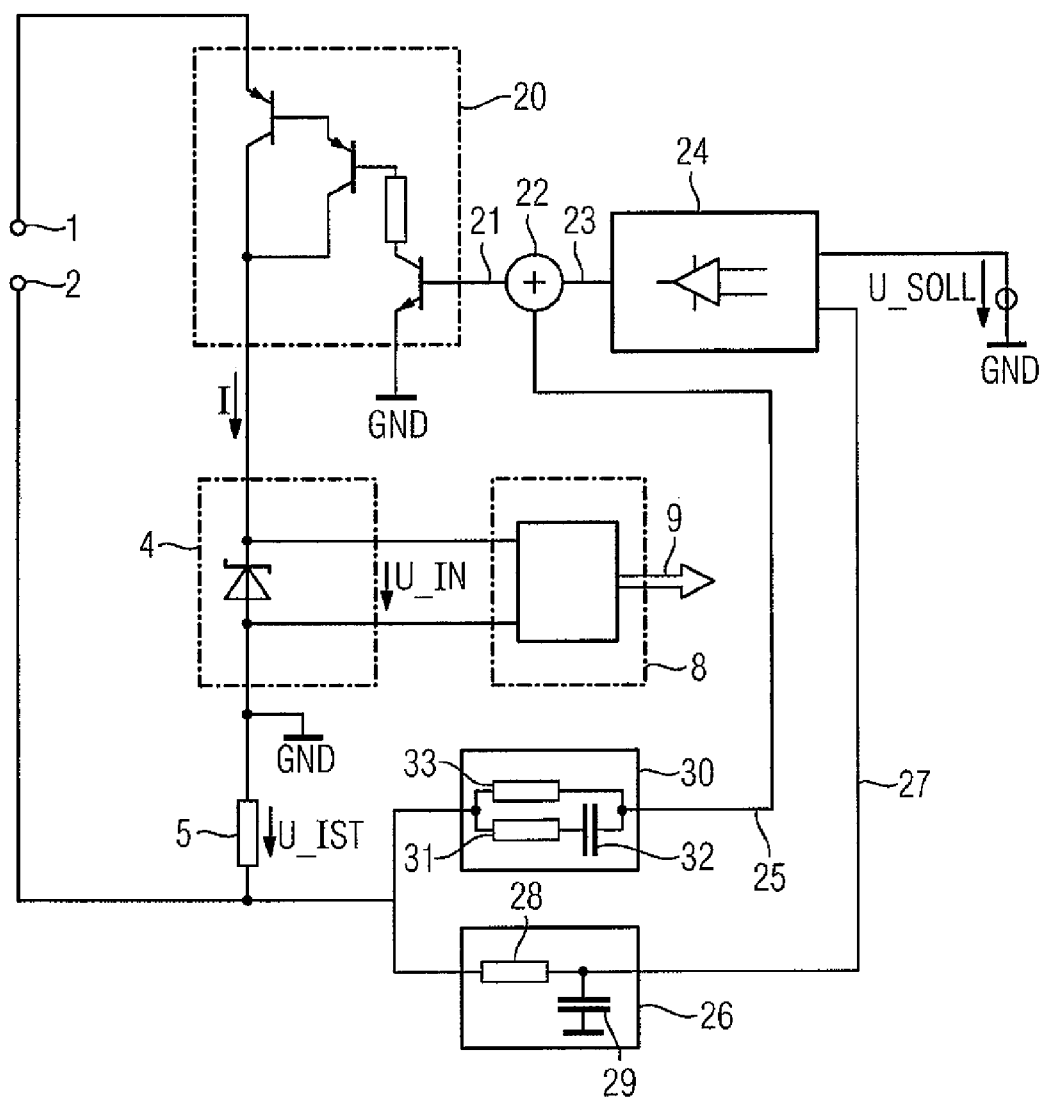
FIG. 2 is an exemplary schematic block diagram of an embodiment of an output stage in accordance with the invention.

Many parts of the known output stage shown in FIG. 1 are shown again in the exemplary embodiment of an output stage in FIG. 2. These are provided with the same reference symbols in both figures.

A transistor circuit 20 that contains a Darlington stage is now used in the output stage shown in FIG. 2. This Darlington circuit is distinguished by a considerably higher gain, thus allowing a signal 21 with relatively low signal power to be used to operate it. In the illustrated exemplary embodiment, the signal 21 is produced by a summation point 22 to which a control signal 23, which is output from a regulator 24, and a compensation signal 25 are passed. The measurement resistor 5 is used in the known manner as a way to detect the loop current I as an actual value U_ACT. This actual value U_ACT is passed in a first feedback path 27, in which a first feedback element 26 is connected, to the regulator 24 for production of the control signal 23. The regulator 24 has an integrating behavior and a bandwidth which, for example, ends at 10 kHz. An actual value that is fed back in the first feedback path 27 is compared with a nominal value U_NOM, which is predetermined by a microprocessor, and a control error is formed therefrom, which control error is regulated at zero by the regulator 24. Frequency components in a medium and high frequency range are isolated from the regulator 24 by the feedback element 26 with a low-pass filter, because this is responsible for precise adjustment of the analog current signal, which corresponds to a measured value to be output, only in the lower frequency range. The low-pass filter can be provided in a simple manner by a resistor 28 in the order of magnitude of 100 kΩ and a capacitor 29 in the order of magnitude of 1 nF.

A secondary condition for optimization of the circuit is that the HART communication must be taken into account. The HART signal is passed to the regulator 24 with the nominal value U_NOM as a superimposed, frequency-modulated signal, and is output into the control loop by means of the transistor circuit 20. The frequency responses of the regulator 24 and of the transistor circuit 20 must be appropriately adapted, such that the HART signals comply with the specification in accordance with HCF_SPEC-54 from the HART Communication Foundation.

EMC disturbances comprising radio-frequency signals superimposed on the actual value U_ACT are suppressed with the aid of a compensation signal 25. A second feedback element 30, which contains a high-pass filter and a proportional element connected in parallel w, is connected in the second feedback path, in order to produce the compensation signal 25. The high-pass filter is formed by a resistor 31 with a capacitor 32 connected in series, the values of which are likewise respectively in the order of magnitude of 100 kΩ and 1 nF. A resistor 33 connected in parallel to the high-pass filter 31, 32, likewise in the order of magnitude of 100 kΩ, acts as a proportional element. The precise values of the components that are used in the first feedback element 26 and in the second feedback element 30 are very highly dependent on the characteristics of the transistor circuit 20 and the regulator 24. They are therefore advantageously optimized empirically for the respectively used types. This can be done in a simple manner by passing specific EMC disturbances to the connections 1 and 2 and by assessing the respectively achieved suppression. The summation point 22 may be created with particularly little complexity as a current node point, if the regulator 24 is a regulator with a current output. The control signal 23 is then simply superimposed on the compensation signal 25, which is passed via the second feedback path to the summation point 22, with both being represented by current signals, in a node point for forming the drive signal 21.

The reference potential for the measurement transducer is advantageously located in the series circuit between the voltage supply 4 and the measurement resistor 5. A negative voltage is therefore dropped across the measurement resistor 5, and the signals in the two feedback paths are of opposite polarity, without any need for further circuit measures for this purpose.

It is particularly clear from the exemplary embodiment that the rapid, subordinate control loop is responsible for the suppression of EMC disturbances, and the comparatively slow, outer control loop is responsible for precise adjustment of the loop current I. This functional isolation allows good optimization of the two control loops for the respective task. Furthermore, the output stage shown in FIG. 2 is distinguished by a comparatively low power consumption, as a result of which more operating power is available for providing the wide range of functions of the measurement transducer. The proportional element in the second feedback element 30 reduces the gain, and therefore reduces the sensitivity of the transistor circuit 20 to noise from the regulator 24. This feedback and the reduction of the gain furthermore result in the characteristic of the output stage being more linear, while reducing its dependency on the temperature.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A field device for process instrumentation, comprising:
an interface for connecting a two-wire line, the interface including a series circuit having a transistor circuit by which a loop current of the interface is adjustable as a function of a control signal;
an electrical power supply configured to produce operating energy for the field device based on the loop current and a voltage drop;
a device configured to detect the loop current as an actual value;
a regulator;
a first feedback path, the actual value being passed through the first feedback path to the regulator for producing the control signal, and a nominal value corresponding to a measured value to be transmitted being supplied to the regulator for comparison with the actual value;
a second feedback path, the actual value being passed through the second feedback path as a compensation signal for suppression of disturbances injected via the two-wire line to a summation point provided for production of an input signal for the transistor circuit as a function of the control signal and the compensation signal.

2. The field device as claimed in claim 1, further comprising:
   a high-pass filter arranged in the second feedback path, the high-pass filter being configured to produce the compensation signal.

3. The field device as claimed in claim 2, further comprising:
   a proportional element connected in parallel with the high-pass filter for superimposition of a component proportional to the loop current.

4. The field device as claimed in claim 1, further comprising:
   a low-pass filter arranged in the first feedback path.

5. The field device as claimed in claim 1, wherein the transistor circuit includes a Darlington circuit for adjustment of the loop current.

6. The field device as claimed in claim 1, wherein the interface is a standardized 4-20 mA interface.

* * * * *